No. 757,729. PATENTED APR. 19, 1904.
J. EVANS.
PIN RETAINER.
APPLICATION FILED NOV. 30, 1903.
NO MODEL.

Witnesses
Charles C. Wright
John H. Hill

Inventor
James Evans
By Howard A. Combs
his Attorney

No. 757,729. Patented April 19, 1904.

UNITED STATES PATENT OFFICE.

JAMES EVANS, OF HARRISBURG, PENNSYLVANIA.

PIN-RETAINER.

SPECIFICATION forming part of Letters Patent No. 757,729, dated April 19, 1904.

Application filed November 30, 1903. Serial No. 183,149. (No model.)

*To all whom it may concern:*

Be it known that I, JAMES EVANS, a citizen of the United States, residing at Harrisburg, in the county of Dauphin and State of Pennsylvania, have invented new and useful Improvements in Pin-Retainers, of which the following is a specification.

My invention relates to pin-retainers—that is to say, to devices which are designed to be clamped onto the shank of scarf-pins and the like to prevent their accidental withdrawal from the clothing of the wearer.

The object of my invention is to improve existing devices of this nature by so constructing the retainer that its application to and removal from the pin will be extremely easy and convenient and so that when applied it will remain securely in place until intentionally removed. Where, as has generally been the case with devices of this kind, the retainer had to be passed over the point of the pin and slid up to the position in which it was to be clamped, a good deal of inconvenience has been caused, owing to the fact that it was difficult to locate the aperture in the retainer through which the pin had to pass, the wearer having, of course, to apply the retainer without being able to see the pin. I obviate this disadvantage by constructing the retainer with clamping-jaws open laterally somewhat in the form of a vise, so that it can be placed on the pin at any portion of the length thereof and then securely clamped thereon.

In the accompanying drawings I have illustrated a preferred form of my improved retainer, although the advantages thereof are not necessarily lost by making minor changes and modifications in the precise form of the retainer.

Figure 1:
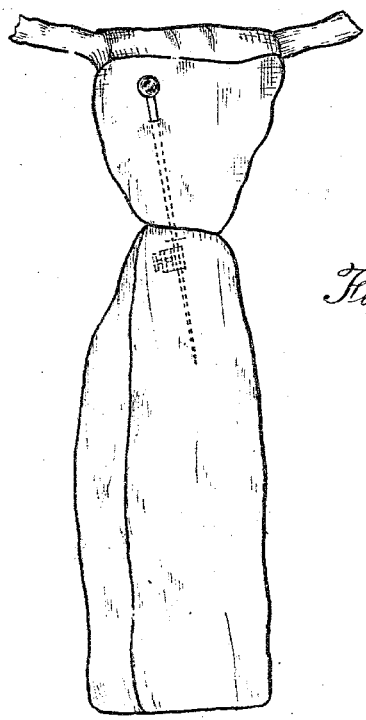
Figure 2:
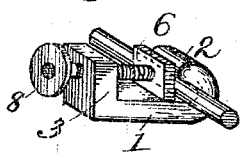
Figure 3:
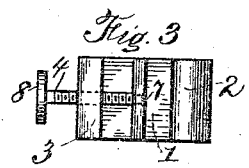
Figure 4:
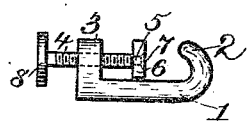

In the said drawings, Figure 1 illustrates by way of example a scarf-pin secured in a necktie by means of my retainer. Fig. 2 is a perspective view of the retainer as clamped upon the shank of a pin. Fig. 3 is a plan view, and Fig. 4 is a side elevation, of the retainer in its open position.

In the form shown the retainer consists of a base-plate 1, having one end thereof upturned and slightly bent over to form a fixed abutment or jaw 2, having a concave recess for the reception of the shank of the pin. On the same side of the base-plate 1, but at the other end thereof, is formed the flange 3, having a screw-threaded aperture therein through which is passed the screw 4. The inner end of said screw is reduced, as at 5, forming a shoulder, and on said reduced portion is pivotally mounted the movable clamping-jaw 6, the same being secured on the screw against the said shoulder by riveting over the end of said reduced portion 5, as indicated at 7, Figs. 3 and 4. The outer end of the screw 4 carries a head 8, by which said screw is manipulated.

In operation the movable jaw is withdrawn from the fixed jaw 2, and after the pin has been passed through the necktie or other garment the retainer is passed laterally over the shank of the pin and is then moved endwise to bring the jaw 2 against and partially over said shank. The screw 4 is then manipulated, carrying the jaw 6 against the shank of the pin, as shown in Fig. 2, by which means the retainer is firmly secured on the pin.

By constructing the retainer so that it can be instantly applied to the pin or any portion of the length thereof without its being necessary to thread it over the point of the pin a great saving in time and trouble in applying and removing the retainer is secured, and by carrying the fixed jaw to overhang, so as to form a concave recess, the retainer can be as securely held in place as if the pin were passed through an aperture in the retainer.

As above stated, modifications may be made in the precise form of the retainer without sacrificing its advantages, and it is in no way limited to use on a scarf-pin, but may be employed wherever it is desired to secure a jewelry-pin or any other form of pin in the clothing or elsewhere.

What I claim is—

1. A pin-retainer comprising a base-plate carrying a concave clamping member, a coöperating flat clamping member and means to move one of said members toward and away from the other, whereby the retainer can be applied laterally to the shank of a pin and will be incapable of lateral removal therefrom when said members are closed on the shank.

2. A pin-retainer comprising a base-plate carrying a stationary jaw having a slightly-concaved clamping-surface, a coöperating movable jaw having a flat clamping-surface and means to actuate the latter jaw, whereby the retainer can be applied laterally to the shank of a pin, and will be incapable of lateral removal therefrom when said members are closed on the shank.

In testimony whereof I have signed my name to this specification in the presence of two subscribing witnesses.

JAMES EVANS.

Witnesses:
E. G. HOOVER,
FRANK E. ZIEGLER.